United States Patent
Smith

[11] 3,837,497
[45] Sept. 24, 1974

[54] FILTER ASSEMBLY
[75] Inventor: Russell F. Smith, St. Louis, Mo.
[73] Assignee: ACF Industries, Incorporated, New York, N.Y.
[22] Filed: Aug. 14, 1972
[21] Appl. No.: 280,236

[52] U.S. Cl. .............................. 210/349, 210/416
[51] Int. Cl. ........................................... B01d 27/00
[58] Field of Search .................... 210/136, 416, 349

[56] References Cited
UNITED STATES PATENTS
2,915,185  12/1959  Waldherr, Jr. ...................... 210/349
3,409,135  11/1968  Bradley et al ...................... 210/136

Primary Examiner—Frank A. Spear, Jr.
Assistant Examiner—F. F. Calvetti

[57] ABSTRACT

A disposable fuel pump filter assembly for insertion into a valve enclosure includes a first air dome in one end. A second air dome in the other end is defined by a conduit through which fuel passes to and from a filter chamber, a seal surrounding the second end of the filter assembly, and the wall of the valve enclosure itself.

2 Claims, 4 Drawing Figures

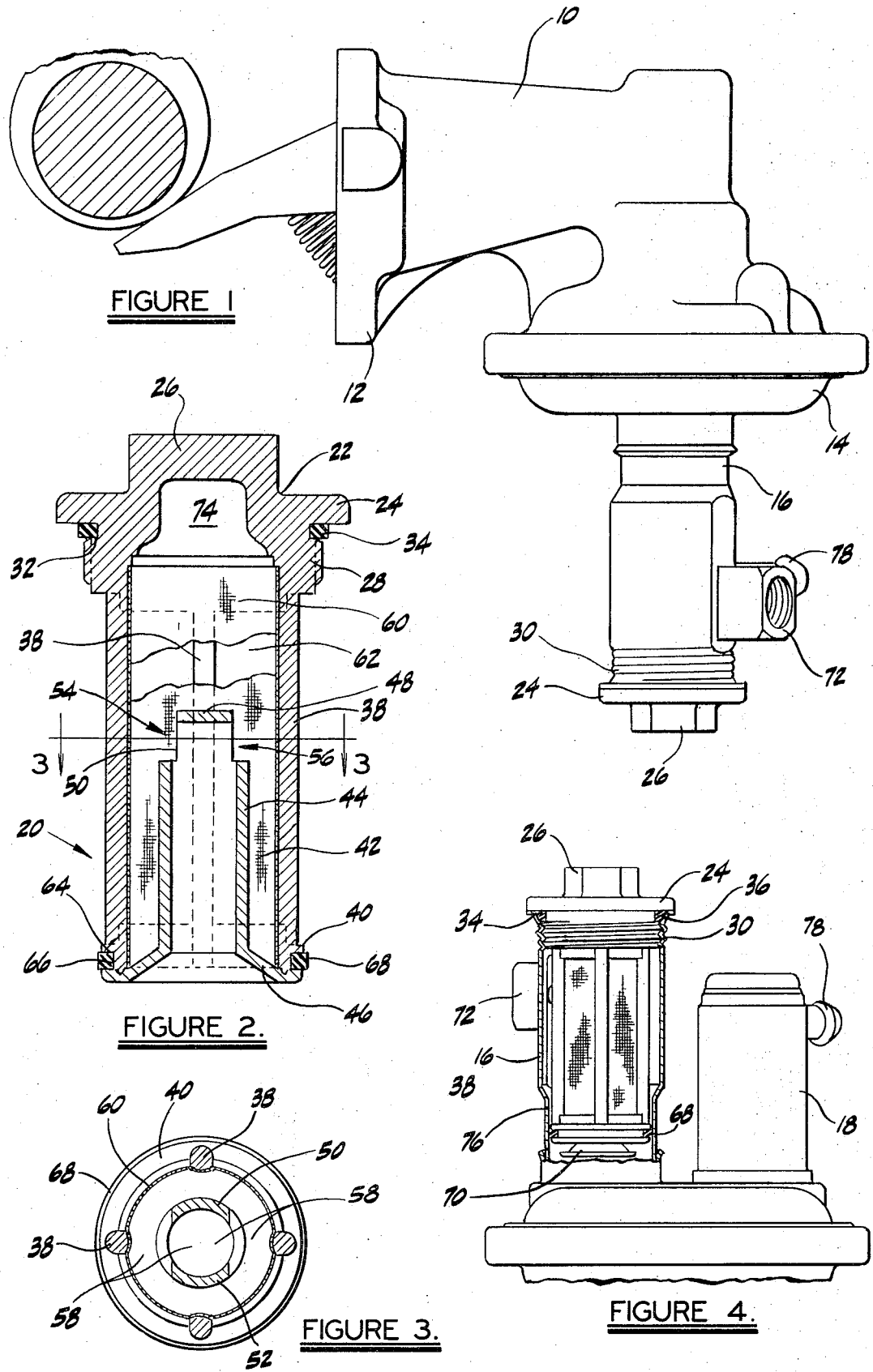

FILTER ASSEMBLY

BACKGROUND OF THE INVENTION

This invention relates to a replaceable filter cartridge for use in fuel pumps; and, more particularly, to such a filter that can be placed in either upwardly or downwardly oriented inlet or outlet chambers of a fuel pump; and can be replaced without removing the pump's fuel line fittings.

When the diaphragm of an automotive fuel pump is reciprocated very rapidly it causes pulsations in the pump's fuel inlet and outlet lines. Hence, as taught in U.S. Pat. No. 3,096,722 to Fitzgerald et al., pulsation chambers or air domes have been placed in fuel pumps to dampen the pump's pulsations and permit more effective operation of the pump's valves.

U.S. Pat. No. 3,409,135 to Bradley et al. discloses a replaceable cartridge filter having an integral air dome; and wherein the filter unit can be removed for periodic replacement. The Bradley filter, however, is used with a fuel pump such as that described in U.S. Pat. No. 3,150,601 to R. F. Smith et al. That is, a pump having protruding valve enclosures which extend either upwardly or downwardly from a pump housing. In this regard, one type of replaceable filter has been used if the valve housing protrudes upwardly; and another type of filter has been used when the valve housing protrudes downwardly. Hence, it is an object of this invention to provide a single filter cartridge which is operative to form an air dome whether it is installed in either an upwardly or a downwardly protruding valve enclosure.

It has also been previously customary to pass fuel into or out of the ends of the pump's valve enclosures which, for the Bradley-type of filter cartridge, required the pump's fuel fittings to be removed in order to replace a filter cartridge. Consequently, it is another object of this invention to provide a replacement filter cartridge which is not only adapted for both upward and downward orientation in the pump, but which can be removed from the pump for replacement without disconnecting the pump's fuel line fittings.

SUMMARY OF THE INVENTION

In accordance with principles of the invention, a filter chamber is closed at one end and has an air dome molded therein. A conduit extends from the other end of the filter chamber towards its center; and a seal element extends around the conduit end of the filter element. In this manner, when the filter element is inserted in a valve enclosure, a second air dome is formed at the conduit end of the filter chamber by means of the conduit, the seal, and the valve enclosure wall itself. Hence, when the filter element is installed in the flow passage of a fuel pump, an air dome can be formed at either end of the filter chamber without regard to whether it protruded upwardly or downwardly; or whether it is used on the pump's inlet or outlet.

A seal is also located at the end of the filter element corresponding to the chamber's closed end. This seal is adapted to form a pump closure. Hence, the pump's fuel lines can be connected between the seals to the sides of the valve enclosures so that the filter elements themselves can be removed for replacement without disconnecting the pump's fuel lines. This is in contrast to prior removable cartridges which required an engine's fuel lines to be connected to the fuel pump through the outermost end of the cartridge.

It will be appreciated from the foregoing brief summary of the invention that it provides a single filter element which can be inserted into a pump's valve enclosures no matter how they are oriented; and permits the filter elements to be replaced without requiring disconnection of the pump's external fuel lines.

BRIEF DESCRIPTION OF THE DRAWINGS

The foregoing and other objects, features, and advantages of this invention will be apparent from the following more particular description of a preferred embodiment thereof as illustrated in the accompanying drawings wherein the same reference numerals refer to the same parts throughout the various views. The drawings are not necessarily intended to be to scale, but rather are presented to illustrate the principles of the invention in clear form.

FIG. 1 is a side elevation of an automotive fuel pump of the type in which the instant invention has particular utility;

FIG. 2 is a vertical sectional view of a disposable filter element embodying the invention;

FIG. 3 is a sectional view of the FIG. 2 embodiment taken along the lines 3—3 thereof; and, FIG. 4 is a side elevation partially in section of the FIG. 2 embodiment installed in an upwardly protruding valve enclosure on an automotive fuel pump similar to that illustrated in FIG. 1.

DETAILED DESCRIPTION

Referring to FIG. 1 the instant invention is incorporated into a mechanically actuated pump similar in structure and operation to that shown in U.S. Pat. No. 3,150,601 to R. F. Smith et al. This construction consists primarily of a pump casing 10 having a flange 12 at one end for affixing the pump to an engine cylinder block. A housing 14 is affixed to the casing 10 at a peripheral joint to form a fluid tight seal; and a valve enclosure 16 protrudes upwardly from the housing 14. (In FIG. 4 valve enclosures 16 and 18 protrude upwardly from the housing 14.)

A replaceable filter cartridge 20 is illustrated in FIG. 2. Therein, a body portion 22 has a circumferential flange 24 under an integral hexagonal head 26 for facilitating threadable insertion and removal of the cartridge into a valve enclosure as illustrated in FIG. 4. In this regard, the body 22 is provided with a threaded portion 28 for mating with a corresponding portion 30 on the valve enclosure 16. The body also includes a circumferential groove 32 for accommodating a washer-type resilient gasket or seal 34 for engaging the upper wall portion 36 of the valve enclosures 16 to form a peripheral fluid seal when the cartridge 20 is threaded into the enclosure 16 as shown in FIG. 4.

A plurality of support columns 38 extend from the outer edge of the body member 22 in a generally parallel direction to a ring 40 which is thereby spaced from the body 22 by means of the columns 38.

A conduit 42 has a generally cylindrical main portion 44 with a funnel-shaped end cap 46 on one end. The other end is closed by a cap 48 which is held above the cylindrical body 44 by two partial side wall extensions thereof 50 and 52 to form outlet ports 54 and 56 in the conduit 42 so that fuel can flow therethrough in either direction as shown by the arrows 58 in FIG. 3.

The various cartridge elements described thus far are preferably fabricated from plastic so that the funnelended conduit 42 can be ultra sonic welded to the ring 40. In this respect, a fine mesh filter screen 60 is carried on the respective support columns 38 to define a filter chamber 62 between the two ends of the cartridge.

The ring 40 has a circumferential groove 64 therein so that a channel 66 is formed between it and the funnel-shaped end 46 of the conduit 42 when the latter is ultra sonic welded to the ring 40; and, as is also illustrated in FIG. 2, the groove 66 accommodates a second resilient gasket or seal 68 for sealingly engaging the sidewall of the valve enclosure 16 when the cartridge is inserted therein.

The FIG. 4 illustration includes a "mushroom head" portion 70 of an outlet check valve such as that described in more detail in U.S. Pat. No. 3,150,601 to R. F. Smith et al. Hence, in the FIG. 4 embodiment of the invention fuel is forced from the pump housing 24 by means of a diaphragm (not illustrated) through the check valve 70, into the funnel-shaped end 46 of the conduit 42, out of the ports 54 and 56, and into the filter chamber 62. The fuel is then forced through the mesh 60 and out through a fitting 72 toward the carbureator not shown. Solids and other undesirable matter contained in the fuel flow will tend to deposit against the filter screen to remain within the chamber 62 when the cartridge is subsequently threadably removed for replacement.

It should be carefully noted that the interior portion of the cartridge's body member 26 is hollowed out to form an air dome 74. Similarly, it should be noted that the seal 68 at the opposite end of the cartridge prohibits fuel from passing between it and the valve enclosure wall 16. Consequently, a second air dome 76 in FIG. 4 is defined by the enclosure wall 16, the seal 68, and the cylindrical portion 44 of the conduit 42. In this manner, the cartridge of the invention provides an air dome whether it is installed in an upwardly protruding valve enclosure as illustrated in FIG. 4 or a downwardly protruding valve enclosure as illustrated in FIG. 1.

In addition, it will be appreciated that the structure of the invention permits the dual air domes to be established while, at the same time, permitting fuel to pass through the sidewalls of the valve enclosures such as through fittings 72 and 78 in FIGS. 1 and 4. Consequently, in this manner the filter cartridge is adapted for removal from its valve enclosure without disturbing the pump's fuel line connections to fittings such as 72 and 78. It will be appreciated, therefore, that the cartridge of the invention fulfills the objects of a single replaceable cartridge that can be used in either inlet or outlet valve enclosures whether they be upwardly or downwardly oriented; and that the replacement operation itself can be effected without the pump's fuel lines.

While the invention has been particularly shown and described with reference to a preferred embodiment thereof, it will be understood by those skilled in the art that various changes in form and detail may be made therein without departing from the spirit and scope of the invention. For example, although the cartridge of the invention has been illustrated as being threadably inserted into its valve enclosures, it will be understood that other types of engagement can also be employed. Similarly, although the illustrated embodiment is described in terms of specific materials it should be understood that other materials could be substituted with satisfactory results.

The embodiments of the invention in which an exclusive property or privilege is claimed are defined as follows:

1. A disposable filter element for insertion in a flow passage of a fluid pump comprising:

A body member having first and second ends and filtering means therebetween forming a filter chamber;

conduit means in said first end forming a passage therethrough and extending into said filter chamber for communicating with said filter chamber to carry a stream of fluid;

seal means at said first end for sealing said first end to said flow passage when said filter is inserted therein whereby said filter is adapted to form a first air dome defined by said flow passage, said seal means, and said conduit;

means in said second end defining a second air dome;

second seal means around said second end for sealing said second end to said flow passage when said filter is inserted therein;

means at said second end adapted to threadably engage said flow passage; and means in said flow passage for connecting fluid lines thereto so that fluid passes between said filter chamber and said fluid lines at a point on said flow passage intermediate the seal means at said first and second ends, whereby said filter element is adapted for selective removal from said flow passage without disconnecting said fluid lines from said flow passage.

2. A disposable filter element for insertion in a flow passage of a fluid pump comprising:

a body member having first and second ends and filtering means therebetween forming a filter chamber;

conduit means in said first end forming a passage therethrough and extending into said filter chamber for communicating with said filter chamber to carry a stream of fluids;

seal means at said first end for sealing said first end to said flow passage when said filter is inserted therein whereby said filter is adapted to form a first air dome defined by said flow passage, said seal means, and said conduit;

means in said second end defining a second air dome;

said conduit including a centrally apertured cap on one end; a closed cap on the other end; and ports on the sides of said other end for passing said stream of fluid between said conduit and said filter chamber;

means in said flow passage for connecting fluid lines thereto so that fluid passes between said filter chamber and said fluid lines at a point on said flow passage intermediate the seal means at said first and second ends; and means at said second end adapted to threadably engage said flow passage whereby said filter element is adapted for selective removal from said flow passage without disconnecting said fluid lines from said flow passage.

* * * * *